TECHNIQUE FOR THE FABRICATION OF A PHOTOLITHOGRAPHICALLY
DEFINABLE, GLASS COVERED GOLD CONDUCTOR PATTERN

Filed March 15, 1971

INVENTOR
G. B. FEFFERMAN
BY
ATTORNEY

United States Patent Office 3,676,087
Patented July 11, 1972

3,676,087

TECHNIQUE FOR THE FABRICATION OF A PHOTOLITHOGRAPHICALLY DEFINABLE, GLASS COVERED GOLD CONDUCTOR PATTERN

Gerald Burt Fefferman, Parsippany, N.J., assignor to Bell Telephone Laboratories, Incorporated, Murray Hill, N.J.

Filed Mar. 15, 1971, Ser. No. 123,973
Int. Cl. B23p *3/20;* C23b *5/50;* B44d *1/14*
U.S. Cl. 29—195 G 5 Claims

ABSTRACT OF THE DISCLOSURE

A technique is described for enhancing the wettability characteristics of a photolithographically definable gold conductor pattern with respect to glass wherein a thin film of rhodium is interposed between the gold and the applied glass film. The resultant structure includes a smooth, defect-free glass insulating film and is uniquely suited for multilayer electronic circuitry including a glass dielectric.

BACKGROUND OF THE INVENTION

(1) Field of the invention

This invention relates to a technique for depositing glass films upon a gold conductor pattern. More particularly, the present invention relates to a technique for depositing glass films upon photolithographically definable gold conductor patterns wherein the wettability characteristics of the gold are enhanced with respect to glass.

(2) Description of the prior art

In the fabrication of multilayer circuitry it is ofttimes desirable to have a smooth defect-free glass insulating layer upon a conductive metal pattern. Unfortunately, glass in its molten state is notoriously poor in its ability to wet certain popular conductors, particularly gold, a material in widespread use as a conductor metallization.

Heretofore, glass has typically been deposited upon conductive patterns by applying a film of submicron sized particles dispersed in an organic medium by screen printing, spraying, tape transfer or any of the well-known techniques suitable for obtaining uniform films. Thereafter, firing of the resultant assembly is effected for the purpose of pyrolizing the organic constituents and melting the glass particles, so resulting in the coalescence of the latter into a continuous film. Unfortunately, during the course of this firing operation, a dewetting of the glass over the gold occurs, such being indicated by the shrinkage of individual glass areas, the enlargement of existing openings and the appearance of new openings therein. Studies have revealed that firing of the glass film to a lower peak temperature and/or soaking at a given peak temperature for a shorter time period will reduce the repellency, however, typically at the expense of a decrease in the quality of the glaze.

SUMMARY OF THE INVENTION

In accordance with the present invention, these prior art deficiencies have been effectively obviated by a novel technique wherein the wettability characteristics of the conductor pattern of interest with respect to glass are enhanced by the interposition of a film of rhodium intermediate the conductor material and the glass. Briefly, the inventive technique involves delineating a gold conductor pattern upon a substrate, electroplating additional gold and rhodium thereon successively and finally depositing a covering glass layer. The resultant structure includes a smooth defect-free layer of high quality glass and manifests superior conductor resolution and sheet resistivity for equivalent film thicknesses as compared with conventional prior art structures.

BRIEF DESCRIPTION OF THE DRAWING

The invention will be more readily understood by reference to the following detailed description taken in conjunction with the accompanying drawing wherein.

DETAILED DESCRIPTION

A description of the material selected for use in the practice of the present invention will now be given. The substrate member may be selected from among those materials normally utilized in thin film and integrated circuitry and should be capable of withstanding temperatures to which it will be subjected during the firing stage of the process (approximately 1750° F.). Additionally, it is desirable that the substrate material evidence a thermal expansivity similar to that of the glass to be deposited thereon. The present invention is primarily directed toward the use of high density alumina substrates which for purposes of this invention are defined as compositions containing at least 85 percent by weight aluminum oxide.

The source of the gold employed herein as the base metal layer is a gold resinate which is physically admixed with other metallic resinates, such as the resinates of lead, sodium or metalloids, and may be conveniently obtained in the manner set forth in copending application, Ser. No. 862,481, filed Sept. 30, 1969.

Figure 1:
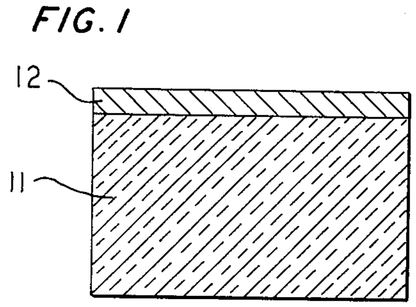
FIG. 1 is a front-elevational view in cross-section of a substrate member having deposited thereon a layer of gold in accordance with the present invention.

With reference now more particularly to FIG. 1, there is shown a suitable substrate member 11 having deposited thereon an adherent continuous gold film 12 prepared in the manner described in the copending application alluded to herein. The thickness of the film 12 is important and should be maintained within the range of 1000 to 5000 A. Studies have revealed that if films less than 1000 A. in thickness are employed, their conductivity will be insufficient for subsequent electroplating. Films appreciably in excess of 5000 A. in thickness do not fire satisfactorily, so resulting in poor separation of the organic constituents.

Figure 2:
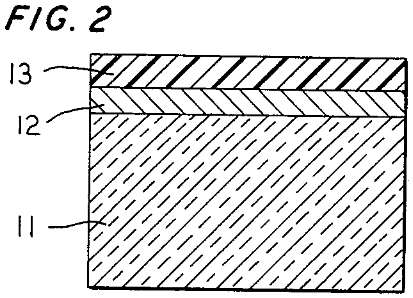
FIG. 2 is a front-elevational view in cross-section of the structure of FIG. 1 after the deposition thereon of a photoresist.
Figure 3:
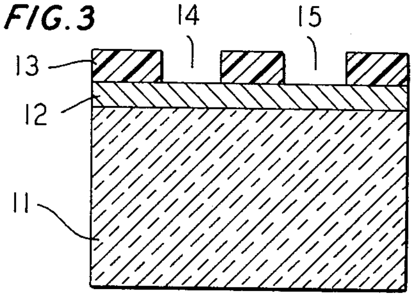
FIG. 3 is a front-elevational view in cross-section of the structure of FIG. 2 after the exposure and removal therefrom of a portion of the photoresist.

The next step in the practice of the present invention involves depositing a photoresist 13 (FIG. 2) upon the entirety of gold film 12 and exposing and developing it in accordance with conventional techniques. During this stage of the processing, the photoresist is removed as, for example, at 14 and 15 (FIG. 3), in those areas wherein the conductor pattern is to be formed during the subsequent stages of processing. Any of the well-known commercially available photoresists and processing techniques may be used for this purpose.

Figure 4:
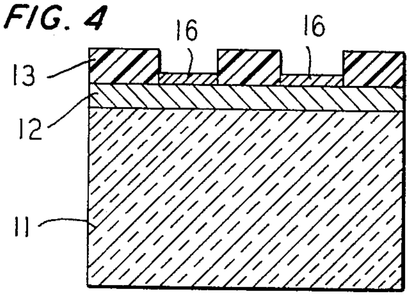
FIG. 4 is a front-elevational view in cross-section of the structure of FIG. 3 after additional gold is pattern electroplated thereon.

The assembly is then placed in a standard gold electroplating bath and additional gold 16 (FIG. 4) electroplated upon the existent gold film 12 in those portions thereof, where the photoresist had been removed, in order to increase the conductivity of the gold to a desired level. Studies have revealed that the sheet resistivity of the gold film 12 obtained by the deposition technique described is not sufficiently low enough to assure adequate current carrying capacity for typical microelectronic circuitry, 10 milliohms per square or less being considered a desirable value. The only satisfactory method for attaining this end is by electroplating techniques. The thickness of the electroplated gold film may range from 10,000 A. to 100,000 A., such limits being dictated by the desired sheet resistivity of the conductor film.

Figure 5:
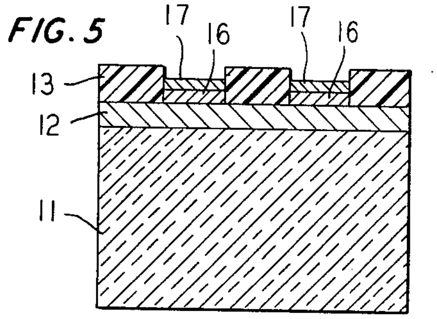
FIG. 5 is a front-elevational view in cross-section of the structure of FIG. 4 after rhodium is pattern electroplated over the electroplated gold.

Following, the resultant assembly is placed in a standard rhodium electroplating bath and rhodium 17 (FIG. 5) electroplated upon gold layer 16 by conventional techniques. The thickness of the rhodium film may range from 1000 to 10,000 A., such limits being dictated by practical conditions. The use of less than 1000 A. of rhodium fails to provide a continuous film between gold layer 16 and the glass to be ultimately deposited thereon, so resulting in the deleterious prior art wetting problem. Definition of the rhodium must be achieved by this technique (pattern electroplating) because of its resistance to all commonly used etchants.

Figure 6:
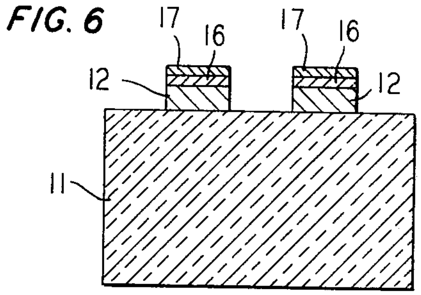
FIG. 6 is a front-elevational view in cross-section of the structure of FIG. 5 after removal of the remaining photoresist and foundation gold.

Then, the remaining photoresist is removed together with the foundation gold layer 12 lying thereunder in background areas, thereby resulting in the assembly shown in FIG. 6. During the foundation gold removal step, the rhodium serves as a protective mask for the gold in the conductor areas.

The defined conductor metallization shown in FIG. 6 is next heated to a temperature of the order of 100° F. above that peak which is to be used for subsequent firing of the glass. In the absence of this heating step, gas bubbles are formed within the glass film during its firing and remain therein after solidification. It has been theorized that the gas comprises hydrogen which is codeposited with the gold during electroplating and desorbed therefrom by catalytic action of the rhodium at elevated temperatures. The heat treatment prior to the glass firing step therefore allows the gas to be freed rather than being entrapped in the glass.

The assembly is now ready for the application thereto of a layer of glass. The glass chosen for use herein may be selected from among any of the well-known glass compositions commonly employed in the electronics industry for encapsulation or other purposes. A glass found particularly suitable for this purpose is described in U.S. Pat. 3,470,002 which was granted on Sept. 30, 1969. This material comprises a mixture of oxides including those of aluminum, silicon, calcium, barium, boron, lead, bismuth, titanium, potassium and arsenic in specific proportions.

Figure 7:
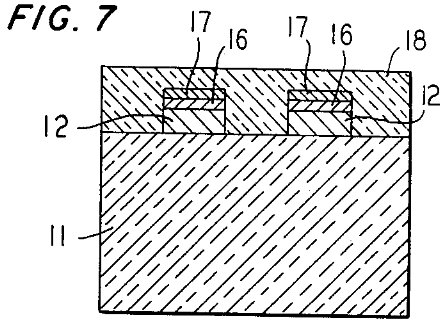
FIG. 7 is a front-elevational view in cross-section of the structure of FIG. 6 after the deposition of a glass film thereon.

The glass composition selected may be applied to the defined conductor pattern shown in FIG. 6 by any conventional technique as, for example, screen printing, spraying as a set spray in combination with a binder, in dry form, as a preformed transfer tape, et cetert. The assembly shown in FIG. 7 includes glass layer 18. Subsequent to the application of the glass, it is permitted to dry in air and fired. Heating is continued until a temperature within the range of 1200 to 1800° F. is attained, such being dependent upon the physical properties of the glass composition of interest. It has been found for the purposes of the present invention that it is desirable to employ a glass film whose thickness ranges from 0.5 to 2.0 mils, such limits being dictated by the function which the film is to perform for a particular application.

Figure 8:
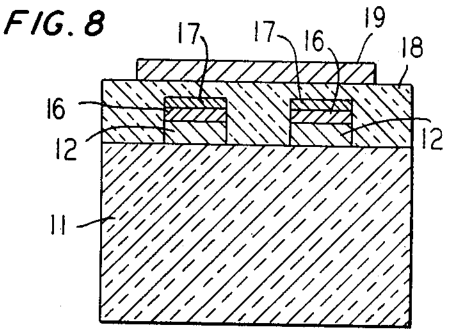
FIG. 8 is a front-elevational view in cross-section of the structure of FIG. 7 after the deposition thereon of a top conductor.

In the fabrication of crossovers in accordance with the described technique, a top conductor 19 (FIG. 8) is deposited upon glass layer 18 by conventional procedures.

An example of the application of the present invention is set forth below. It is intended merely as an illustration and it is to be appreciated that the process described may be varied by one skilled in the art without departing from the spirit and scope of the present invention.

Example

An adherent gold film was formed utilizing (a) 32 parts by weight of a gold resinate solution containing 20 percent by weight of gold in resinate form, (b) 0.210 part by weight of a silicon resinate solution containing 9.3 percent by weight of silicon in resinate form, (c) 0.608 part by weight of a boron resinate solution containing 1.5 percent by weight of boron in resinate form, and (d) 0.190 part by weight of a lead resinate solution containing 27.8 percent by weight of lead in resinate form, each of the constituents previously noted being obtained from commercial sources.

The noted materials were thoroughly mixed and the resultant mixture applied to a 2″ x 2″ 99.5 percent aluminum oxide ceramic substrate by spin coating from a flooded state at 610 r.p.m. for 30 seconds. The spin coated substrate was air dried at 160° F. in a drying oven for one hour to partially remove the thinners and form a tacky coating. Then, the substrate was inserted in a furnace and air fired to 400° F. for 15 minutes to remove all of the thinners. Next, the assembly was air fired to a temperature of 800° F. for 30 minutes to decompose the resinates to form free gold and the oxides of silicon, boron and lead. The temperature was raised to 1400° F. combining the oxides into a lead borosilicate glass (31 percent $SiO_2$, 25 percent of $B_2O_3$ and 44 percent PbO which is uniformly dispersed throughout the gold to form an adherent film composed of 2 percent by weight of glass and 98 percent by weight of gold. The substrate bearing essentially a gold film $3\times10^3$ A. in thickness was then permitted to cool slowly by normal radiation for a period of two hours, at which point a temperature of 400° F. was attained and the assembly was then removed from the furnace. The next step involved the application of a conventional photoresist to the surface of the gold film, a commercially available material in the positive acting resist family being selected for this purpose. The photoresist was then exposed and developed pursuant to conventional techniques for the purpose of exposing the underlying gold film in those areas where the conductor pattern was to be formed during the subsequent processing stages. Then, the assembly was placed in a gold electroplating bath and 50,000 A. of gold deposited by conventional procedures upon the foundation gold layer in the exposed areas. A second electroplating bath was then employed for the purpose of depositing a film of rhodium 4,000 A. in thickness upon the electroplated gold layers, conventional techniques again being utilized to effect this end. Following, the remaining photoresist was removed with a suitable solvent and the foundation gold lying thereunder was removed with a conventional etchant comprising a solution of iodine and potassium iodine, thereby resulting in a pattern of conductive material comprising a 3-layer unit of electroplated rhodium, electroplated gold and gold obtained by the decomposition of resinates. The resultant assembly was next heated at a temperature of 1750° F. for a time period of one hour, so resulting in the elimination of entrapped gas. Thereafter, a glass comprising 8 parts by weight aluminum oxide, 41 parts by weight silicon dioxide, 8.93 parts by weight calcium carbonate, 19.31 parts by weight barium carbonate, 8.88 parts by weight boron oxide, 15.0 parts by weight lead oxide, 16.64 parts by weight bismuth oxide, 1.0 part by weight titanium dioxide, 2.93 parts by weight potassium carbonate and 0.5 part by weight arsenic trioxide, was deposited by screen printing techniques and fired to a temperature of 1650° F., where it was soaked for one hour, thereby resulting in a continuous defect-free glass layer which adhered tenaciously to the underlying metallization.

I claim:

1. Method comprising forming an adherent film of fused glass over a patterned layer of gold on a substrate characterized in that a layer of rhodium is deposited on the gold prior to the formation of the fused layer of glass.

2. Method comprising forming an adherent film of fused glass over the surface of an electroplated layer of gold characterized in that, prior to the formation of the fused glass film, a layer of rhodium is deposited over the gold and the resulting assembly is heated to a temperature higher than that at which the fused glass film is subsequently formed.

3. Method in accordance with claim 2 wherein said gold layer ranges in thickness from 1000 to 5000 A.

4. Method in accordance with claim 2 wherein said rhodium layer ranges in thickness from 1000 to 10,000 A.

5. Product produced in accordance with the method of claim 2.

References Cited

UNITED STATES PATENTS

| | | | |
|---|---|---|---|
| 3,585,064 | 6/1971 | Prosen | 117—70 C |
| 3,518,756 | 7/1970 | Bennett et al. | 204—15 |
| 3,274,024 | 9/1966 | Hill et al. | 204—38 R |
| 3,390,969 | 7/1968 | Sullivan et al. | 29—195 G |

JOHN H. MACK, Primary Examiner

R. L. ANDREWS, Assistant Examiner

U.S. Cl. X.R.

29—199; 117—70 A, C, 71 R, M, 217; 204—15, 38 C